(12) United States Patent
Egea

(10) Patent No.: US 10,884,109 B2
(45) Date of Patent: Jan. 5, 2021

(54) ANALYTICAL-ADAPTIVE MULTIFREQUENCY ERROR MINIMIZATION UNWRAPPING

(71) Applicant: Microsoft Technology Licensing, LLC, Redmond, CA (US)

(72) Inventor: Sergio Ortiz Egea, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 378 days.

(21) Appl. No.: 15/941,885

(22) Filed: Mar. 30, 2018

(65) Prior Publication Data

US 2019/0302244 A1    Oct. 3, 2019

(51) Int. Cl.
*G01S 7/4865* (2020.01)
*G01S 17/89* (2020.01)
*G01S 17/26* (2020.01)

(52) U.S. Cl.
CPC ........... *G01S 7/4865* (2013.01); *G01S 17/26* (2020.01); *G01S 17/89* (2013.01)

(58) Field of Classification Search
CPC .................................................. G01S 7/4865
USPC ........................................................ 702/159
See application file for complete search history.

(56) References Cited

U.S. PATENT DOCUMENTS

| 7,725,288 | B2* | 5/2010 | Boillot | G06F 3/0304 |
| | | | | 702/158 |
| 7,791,715 | B1 | 9/2010 | Bamji | |
| 9,488,722 | B2* | 11/2016 | Waligorski | G01S 7/4915 |
| 9,753,128 | B2* | 9/2017 | Schweizer | G01S 17/36 |
| 2016/0047913 | A1* | 2/2016 | Lamesch | G01S 7/4915 |
| | | | | 702/159 |
| 2016/0116594 | A1* | 4/2016 | Xu | G01S 17/36 |
| | | | | 356/5.1 |
| 2017/0323429 | A1* | 11/2017 | Godbaz | G01S 17/08 |
| 2018/0011195 | A1* | 1/2018 | Perry | G01S 17/89 |
| 2018/0259455 | A1* | 9/2018 | Bhandari | G07D 7/205 |
| 2018/0341008 | A1* | 11/2018 | Ortiz Egea | G01S 17/89 |

* cited by examiner

*Primary Examiner* — Ricky Ngon
(74) *Attorney, Agent, or Firm* — Alleman Hall Creasman & Tuttle LLP

(57) ABSTRACT

Features of the present disclosure implement an analytical formalism to calculate a time of flight (ToF) for a signal in order to identify the distance between the ToF imaging system and a target object. The features of the present disclosure allow a flexible, fast, and accurate solution for phase unwrapping in ToF imaging system. Such techniques minimize the memory usage, accounts for the factors that generally contribute to differences in the performance of the selected modulation frequencies, and mitigates the unwrapping errors that occur in low signal to noise areas.

16 Claims, 7 Drawing Sheets

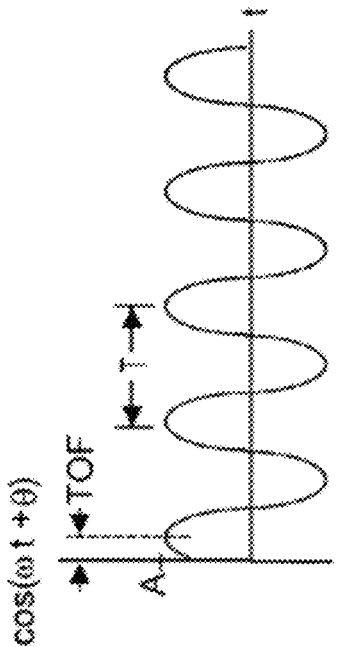
FIG. 1B
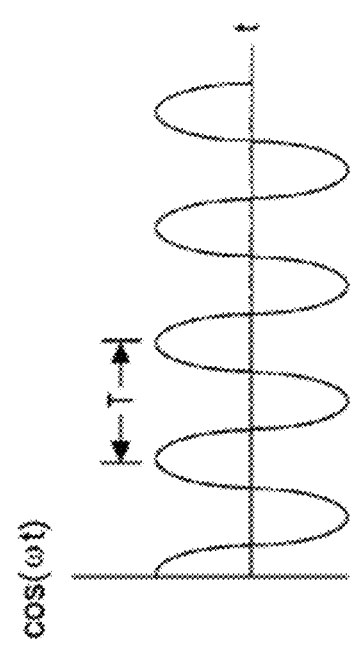
FIG. 1C
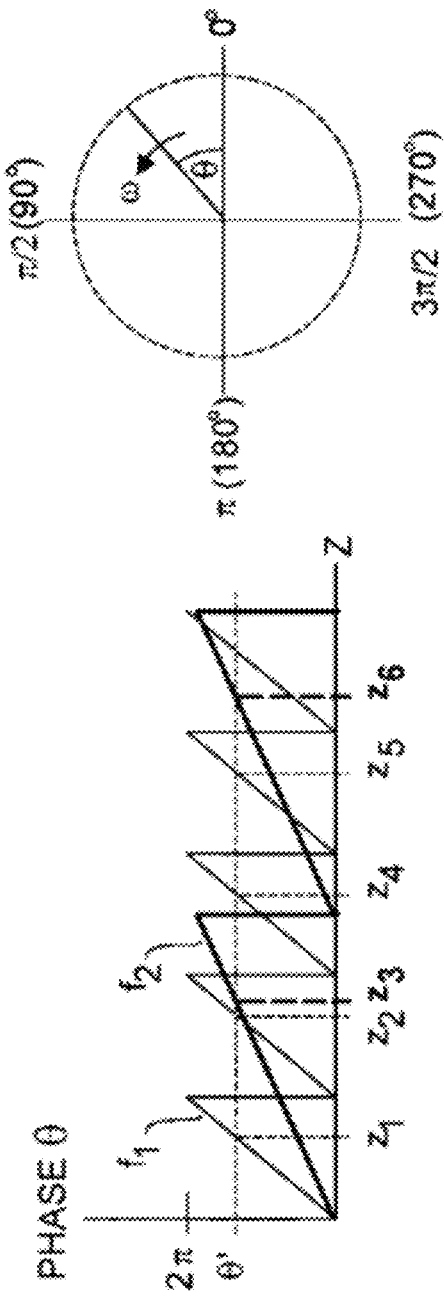
FIG. 1E
FIG. 1D

ANALYTICAL-ADAPTIVE MULTIFREQUENCY ERROR MINIMIZATION UNWRAPPING

FIELD OF THE INVENTION

The invention relates generally to depth imaging systems, and more particularly to time-of-flight (ToF) imaging systems that acquire depth images by measuring the phase-shift of the optical energy by analytical-adaptive multi-frequency error minimization phase unwrapping.

BACKGROUND

A time-of-flight (ToF) is a range imaging system that resolves distance based on the known speed of light by measuring the time-of-flight of a light signal between the imaging and the subject for each point of the image. In recent years, the ToF imaging system have been adopted in a number of applications, including automotive applications (e.g., used in assistance and safety functions for advanced automotive applications such as active pedestrian safety or pre-crash), human-machine interfaces and gaming (e.g., track movements of humans and hand gestures), robotics (e.g., robots that build up a map of the environment), etc.

In ToF imaging system, a source of optical energy is periodically energized and emits optical energy via lens toward an object target. Typically, the optical energy is light, for example emitted by a laser diode or light-emitting diode (LED) device. Some of the emitted optical energy will be reflected off the surface of target object, and will pass through an aperture lens, and will fall upon two-dimensional array of pixel detectors where an image is formed. Each imaging pixel detector measures both intensity or amplitude of the optical energy received, and the phase-shift of the optical energy as it travels from emitter to target object, and then distance again back to imaging sensor array. For each pulse of optical energy transmitted by emitter, a three-dimensional image of the visible portion of target object is acquired. Emitted optical energy traversing to more distant surface regions of target object before being reflected back towards the ToF imaging system will define a longer time-of-flight than radiation falling upon and being reflected from a nearer surface portion of the target object.

In order to accurately measure the distance from the ToF imaging system to the target object, the imaging pixel detector needs to determine the absolute phase given its principal value in order to measure the phase-shift of the optical energy. This seemingly simple task is made difficult by the presence of noise. Indeed, phase unwrapping for real-world applications is one of the most challenging tasks in digital signal processing because the wrapped signal may be noisy and/or under sampled. However, the current phase unwrapping techniques are generally limited because of amount of memory they require, the requirement of calculating weighting factors for enhanced distance calculation, the number of iterations to produce the minimization, the lack of flexibility in the modulation frequency selection, and the high errors in low signal areas, etc.

SUMMARY

Features of the present disclosure solve the above-identified problem by implementing an analytical formalism that allows a flexible, fast, and accurate solution for phase unwrapping in ToF imaging system. Such techniques minimize the memory usage, accounts for the factors that generally contribute to differences in the performance of the selected modulation frequencies, and mitigates the unwrapping errors that occur in low signal to noise areas.

A method for signal processing in a ToF system is described. The method may include emitting, from the ToF system, a signal towards a target object at a first time period, and detecting, as a second time period, the signal reflected off a surface of a target object by an imaging pixel detector of the ToF system. The signal may be associated with a selected pixel in an image from the target object. The method may further include calculating a time of flight between the first time period and the second time period based on analytical formulation to unwrap a phase of the signal. The time of flight may be independent of a modulation frequency used for the signal. The method may further include outputting a distance between the ToF and the target object based on the calculated time of flight for the signal.

A computer device for signal processing in a ToF system is described. The computer device may include a memory to store data and instructions, and a processor in communication with the memory. In some examples, the processor may execute instructions to emit, from the ToF system, a signal towards a target object at a first time period, and detect, as a second time period, the signal reflected off a surface of a target object by an imaging pixel detector of the ToF system. The signal may be associated with a selected pixel in an image from the target object. The computer device may further include instructions to calculate a time of flight between the first time period and the second time period based on analytical formulation to unwrap a phase of the signal. The time of flight may be independent of a modulation frequency used for the signal. The computer device may further include instructions to output a distance between the ToF and the target object based on the calculated time of flight for the signal.

A computer-readable medium storing instructions executable by a computer device for signal processing in a ToF system is described. The computer-readable medium may include instructions for emitting, from the ToF system, a signal towards a target object at a first time period, and detecting, as a second time period, the signal reflected off a surface of a target object by an imaging pixel detector of the ToF system. The signal may be associated with a selected pixel in an image from the target object. The computer-readable medium may further include instructions for calculating a time of flight between the first time period and the second time period based on analytical formulation to unwrap a phase of the signal. The time of flight may be independent of a modulation frequency used for the signal. The computer-readable medium may further include instructions for outputting a distance between the ToF and the target object based on the calculated time of flight for the signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIGS. 1B and 1C depict emitted and reflected optical energy waveforms associated with the imaging system of FIG. 1A in accordance with features of the present disclosure.

FIG. 1D depicts acquired phase-vs-distance for modulation frequencies in accordance with features of the present disclosure.

FIG. 1E is a polar representation of acquired phase data as a function of modulation frequency in accordance with features of the present disclosure.

DETAILED DESCRIPTION

Figure 1A:
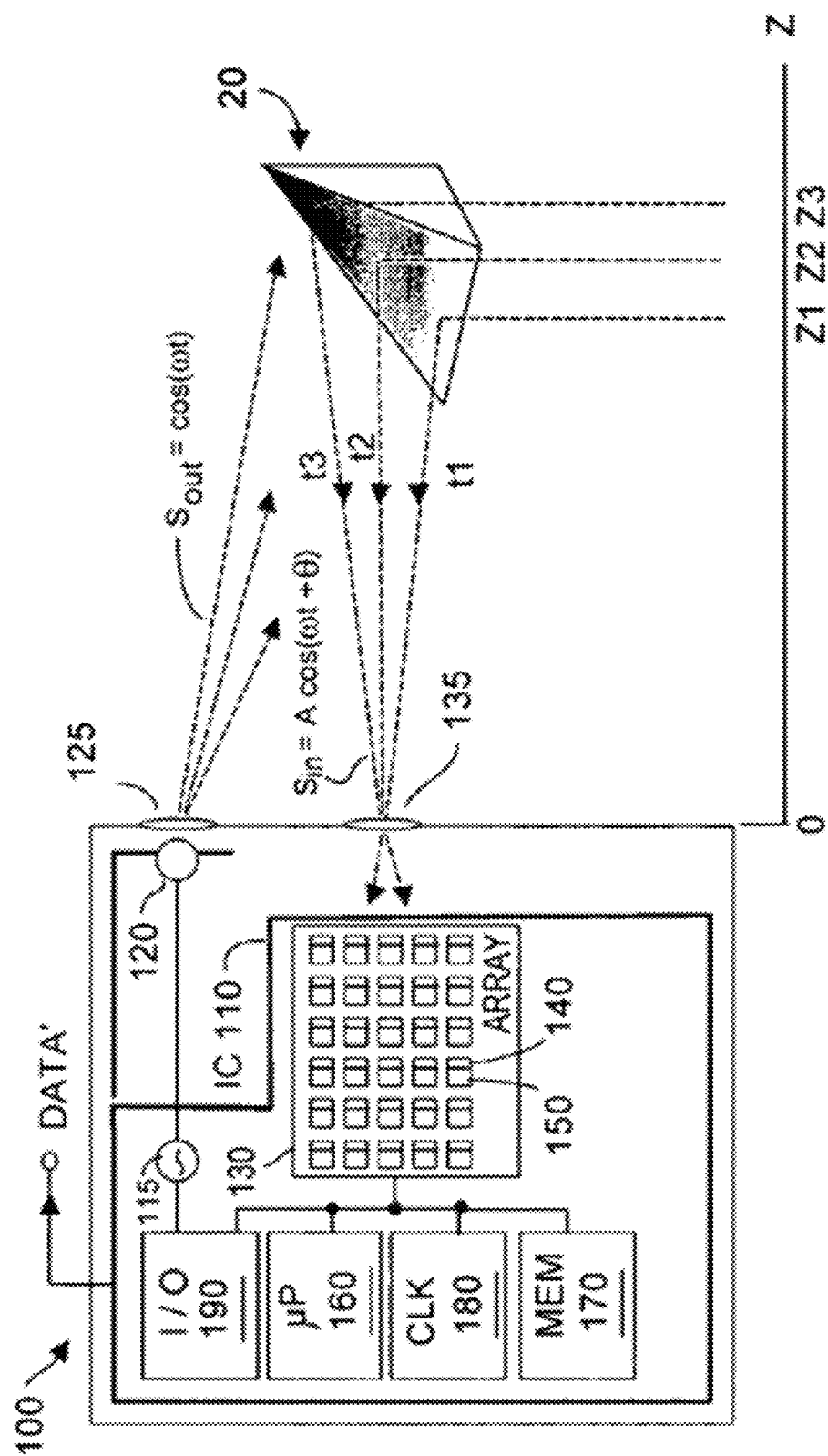
FIG. 1A is a block diagram depicting a phase type time-of-flight three-dimensional imaging system in which features of the present disclosure may operate.

As discussed above, a ToF imaging system determine the distance between the imaging system and the subject for each point of the image based on the known speed of light by measuring the time-of-flight of a light signal. The ToF imaging systems have been adopted in a number of applications, including, but not limited to, automotive applications, human-machine interfaces and gaming, and robotics. Modern ToF imaging systems ascertain depth distances to a target object by emitting modulated optical energy of a known phase, and examining phase-shift in the optical signal reflected from the target object.

In order to accurately measure the distance from the ToF imaging system to the target object, the imaging pixel detector needs to determine the absolute phase given its principal value in order to measure the phase-shift of the optical energy. To this end, the phase-shift ToF depth imaging systems may utilize multiple modulation frequencies (e.g., $f_1$ and $f_2$) in order to determine the phase-shift of the optical energy, and thus the distance between the imaging system and the target object. However, such systems suffer from a number of limitations, including the high memory utilization, the requirement of calculating weighting factors for enhance distance calculation, the number of iterations to produce energy minimization, the lack of flexibility in the modulation frequency selection, and high error rates in low signal areas.

Features of the present disclosure solve the above-identified problem by implementing an analytical formalism that allows a flexible, fast, and accurate solution for phase unwrapping in ToF imaging system. For example, instead of requiring specialized hardware and database that maps distance and phase information for every frequency to be used as a look up table, features of the present disclosure allow identification of the distance using a simpler hardware structure that is less costly. Indeed, the techniques outlined here minimize the memory usage, accounts for the factors that generally contribute to differences in the performance of the selected modulation frequencies, and mitigates the unwrapping errors that occur in low signal to noise areas.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Turning first to FIGS. 1A-1D, a ToF imaging system 100 includes a two-dimensional array 130 of pixel detectors 140. Preferably each of the pixel detectors 140 has dedicated circuitry 150 for processing detection charge output by the associated detector. The ToF imaging system 100 may also include a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, optical energy source 120 is periodically energized by an exciter 115, and emits modulated optical energy toward an object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms). Typically emitter 120 operates in the near IR, with a wavelength of perhaps 800 nm. A lens 125 is commonly used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 135, and will fall upon two-dimensional array 130 of pixel or photodetectors 140. When reflected optical energy $S_{in}$ impinges upon photodetectors 140 in array 130, photons within the photodetectors are released, and converted into tiny amounts of detection current. For ease of explanation, incoming optical energy may be modeled as $S_{in}=A \cdot \cos(\omega t+\theta)$, where A is a brightness or intensity coefficient, $\omega \cdot t$ represents the periodic modulation frequency, and $\theta$ is phase shift.

As distance Z changes, phase shift $\theta$ changes, and FIGS. 1B and 1C depict a phase shift $\theta$ between emitted and detected signals. The phase shift $\theta$ data can be processed to yield desired Z depth information. Within array 130, pixel detection current can be integrated to accumulate a meaningful detection signal, used to form a depth image. In this fashion, ToF system 100 can capture and provide Z depth information at each pixel detector 140 in sensor array 130 for each frame of acquired data.

Specifically, pixel detection information is captured at least two discrete phases, preferably 0° and 90°, and is processed to yield Z data. In practice, changes in distance Z produce change in phase shift $\theta$ but eventually the phase shift begins to repeat, e.g., $\theta=\theta+2 \cdot \pi$, etc. Thus, distance Z is known modulo 2·π·C/2·ω))=C/2·f, where f is the modulation frequency. Accordingly, there can be an inherent ambiguity between detected values of phase shift θ and distance Z, and generally multi-frequency methods are employed to disambiguate or dealias the phase shift data. For example, if system 100 reports a distance Z1, in reality the actual distance may be any of ZN=Z1+N·C/2f, where N is an integer. The nature of this ambiguity may be better understood with reference to FIGS. 1D and 1E. FIG. 1D is a mapping of detected phase θ versus distance Z for system 100, and FIG. 1E is a polar representation in which a vector, depicted as a line rotating counter-clockwise, rotates with velocity ω=dθ/dt=2πf.

Thus, a phase angle θ' for target object 20, where this the information was acquired with a modulation frequency of, for example, 50 MHz, there may be several distances, e.g., z1, z2, z4, z5, etc. that could be represented by any particular phase angle. Accordingly, relying solely on the phase angle may not be sufficient to accurately determine the distance because the various z1, z2, z4, z5, distances are ambiguous and require unwrapping of the phase to identify the correct distance value. Such unwrapping requires complex hardware, including additional memory to map a database of different frequencies associated with various phases and distances. The unwrapping of the phase also adds complexity and thus impact the overall cost and the speed of the depth sensors.

Features of the present disclosure provide a simplified structure based on analytical formulation that may yield an accurate distance information without the need of complex hardware. The techniques outlined here are based on the principles of ToF in that the time that light travels is independent of the modulation frequency of the light. This is true for direct component of the light, defined as the direct back reflection (typically diffuse) that comes from a surface as shown in Equation 1 below:

$$S = Ae^{i\phi} \quad \text{Equation 1}$$

Although the time that light travels is independent of the modulation frequency of the light, contributions to the captured signal (e.g., multipath or noise) may nonetheless make the ToF dependent on modulation frequency of the illumination source, as illustrated in Equation 2:

$$S(f_k) = A(f_k)e^{i\phi(f_k)} k = 1, 2, \ldots, N \quad \text{Equation 2}$$

For example, in the case of the additive random noise that may be produced by detection mechanism and/or subsequent electronics, evaluation of the ToF may be impacted such that it is no longer is independent of the modulation frequency. Particularly, due to the multipath or noise, ToF may be different for every frequency, thereby contributing to errors in distance measurement. It is because of this complexity that existing systems employ specialized hardware to unwrap the phase order to determine the distance between the ToF imaging system and the target object.

In terms of spatial frequency, the direct component of the light may depend on the immediate geometry of the scene, hence a high variability from pixel to pixel. As such, in this instance, the direct component lies in the high frequency domain. However, in the instance of the multipath, the signal has higher degree of correlation among a neighborhood of pixels. Therefore, the global component of light lies in the lower frequency domain. However, from a perspective of the modulation frequency, the behavior of the noise and the multipath may be comparable, pixel by pixel, since the phase or ToF depend on the modulation frequencies. This concept is reflected by considering Equation 2 (see above) as a sum of three contributions: the direct component, the global component that relates to the contribution of multipath, and the noise. See Equation 3:

$$S(f_k) + N(f_k) = S_k + N_k \quad \text{Equation 3}$$
$$= A_k e^{i\phi_k} + A_n(f_k)e^{i\phi_n(f_k)}$$
$$= A_d e^{it_d f_k} + A_g(f_k)e^{i\phi_g(f_k)} + A_n(f_k)e^{i\phi_n(f_k)}$$

Here, while neither the direct component, nor the amplitude ($A_d$) or time of flight ($t_d$, $t_g$) depend on the modulation frequency $f_n$, the global and noise components, however, do indeed depend on the modulation frequency of the light source. Specifically, as illustrated above, the global component of the light can be considered frequency dependent because light can come from more than one point, making the trigonometric terms take different values, thus making the amplitude and phase take a different value for each frequency. The noise component can be modeled as two random variables belonging to a Gaussian distribution, where variance is frequency dependent. Thus, the evaluated amplitude and phase may change for every single frequency that may contribute to the unwrapping errors. However, if multipath is negligible, then the time of flight of light may be same for every single frequency and the phase and amplitude equation may be reflected as follow:

$$\begin{cases} \phi_k = t_k f_k = \operatorname{atan}\left[\dfrac{A_d \cdot \sin(t_d f_k) + A_n(f_k) \cdot \sin[\phi_n(f_k)]}{A_d \cdot \cos(t_d f_k) + A_n(f_k) \cdot \cos[\phi_n(f_k)]}\right] \\ A_k = A_d^2 + A_n^2 + 2A_d A_n(f_k) \cdot \cos[t_d f_k - \phi_n(f_k)] \end{cases} \quad \text{Equation 4}$$

To this end, features of the present disclosure provide techniques for a pixel-wise (see FIG. 2) and neighborhood based solution (see FIG. 3) developed based on an assumption that the signal received from the scene is free of multipath, but not from noise. Based on this assumption, the ToF for light may be comparable, if not the same, for multiple frequencies. Thus, ToF for any specific frequency may be calculated by Equation 5 below that considers the measured phase (affected by noise and/or multipath) in addition to the number of wraps or phase order for any specific frequency ($f_k$):

$$\tilde{t}_k(m, n) = \frac{\tilde{\phi}_k(m, n) + 2\pi n_k}{f_k} \quad \text{Equation 5}$$

In accordance with the techniques of the present disclosure, the phase order for any one specific modulation frequency (k+1) may be calculated based on another frequency (k) as illustrated in Equation 6. Resolving the ToF and the phase order for any one modulation frequency may provide accurate distance for ToF imaging systems.

$$n_{k+1} = \operatorname{round}\left\{\frac{\left|[\tilde{\phi}_k(m, n) + 2\pi n_k(m, n)]\dfrac{f_{k+1}}{f_k} - \tilde{\phi}_{k+1}(m, n)\right|}{2\pi}\right\} \quad \text{Equation 6}$$

Figure 2:
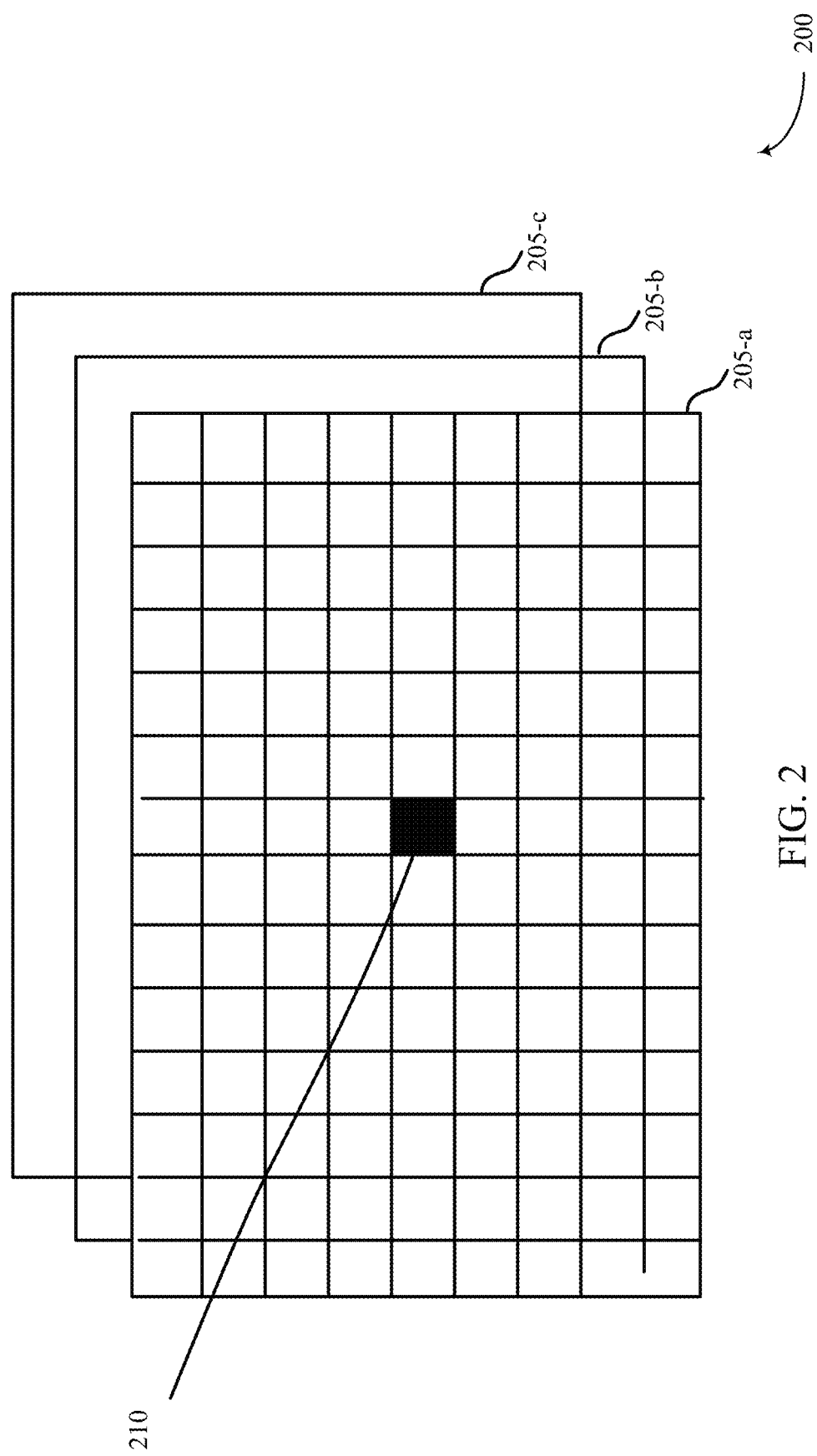
FIG. 2 depicts a pixel-wise technique for calculating the ToF for each pixel in an image in accordance with various aspects of the present disclosure.
Figure 3:
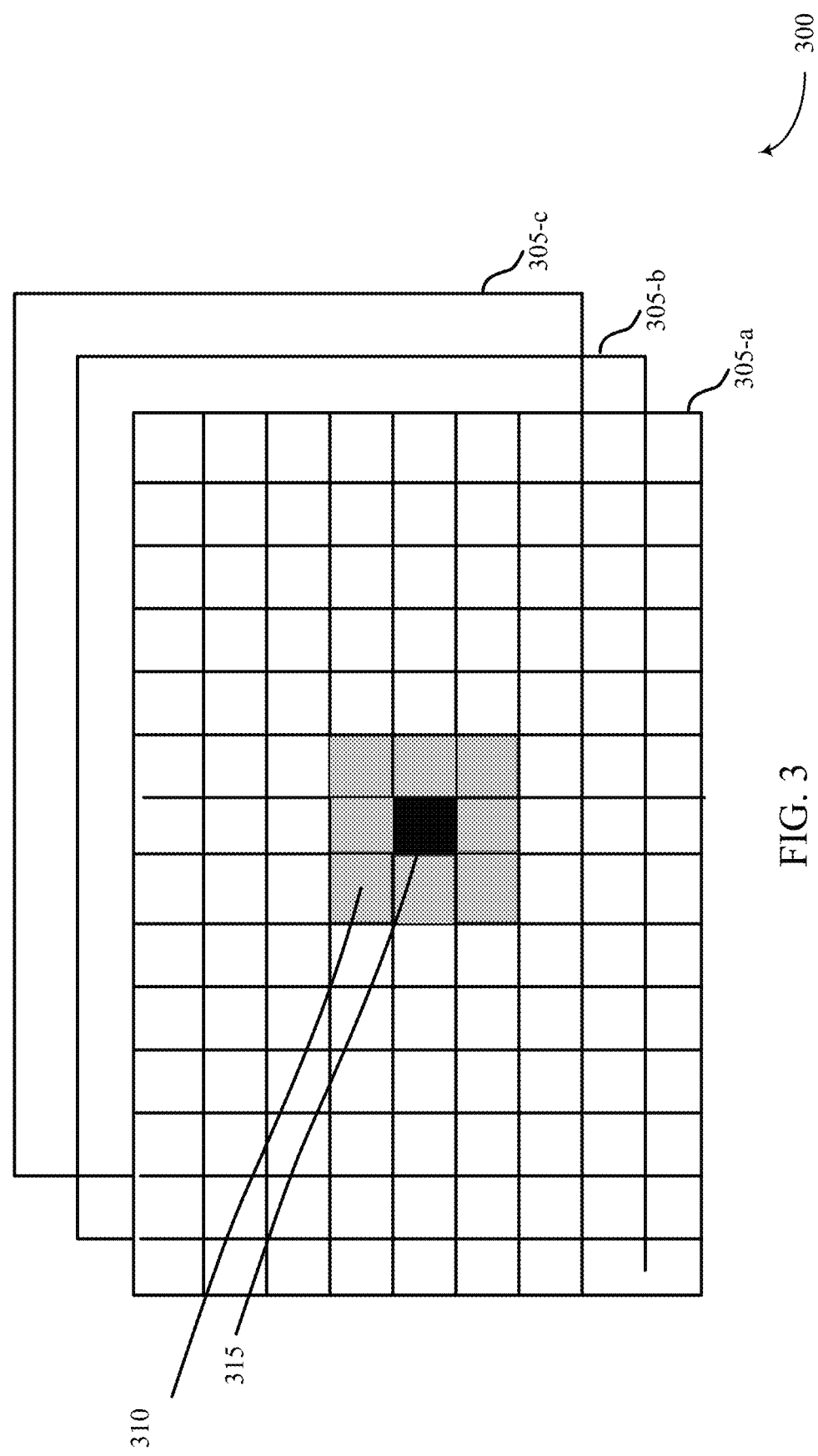
FIG. 3 depicts a neighborhood based technique for calculating the ToF for each pixel in an image in accordance with various aspects of the present disclosure.

FIGS. 2 and 3 describe two techniques—pixel-wise and neighborhood based techniques—for calculating the ToF for a signal that is correlated to the distance between the ToF imaging system 100 and the target object that is simpler and more efficient to implement than existing solutions. Turning first to FIG. 2, a pixel-wise signal detection process for each pixel 210 in an image 200 that is captured by the pixel detectors 140 (see FIG. 1A) based on multiple frequencies 205 is illustrated. Specifically, for each pixel (m, n) 210 in an image 200, the two-dimensional array 130 of pixel detectors 140 calculates the ToF for the light in order to identify the accurate distance (Z) between the ToF imaging system 100 and target object 20. The ToF may be associated with the distance (Z). To this end, the pixel detector 140 identifies the signal collected by any one pixel (m, n) 210 by the two-dimensional array 130 of size (M, N) (e.g., rows and columns) with {m∈1, 2, . . . M}, and {n∈1, 2, . . . N} for frequency k∈1, 2, . . . K (e.g., first frequency 205-a, second frequency 205-b, and third frequency 205-c). The signal collected for each pixel (m, n) 210 may be defined as:

$$\tilde{S}_k(m,n) = \tilde{A}_k(m,n) e^{i\tilde{t}_k(m,n)f_k}$$ Equation 7

This signal, however, may include noise. While previous systems required complex algorithms to account for noise in a signal by employing multi-step noise reductions, features of the present disclosure can identify the ToF (t) based on Equation 8 that preemptively accounts of factors that contribute to the noise errors:

$$t = \frac{\sum_{k=1}^{K} f_k^2 \tilde{A}_k(m,n) \tilde{t}_k(m,n)}{\sum_{k=1}^{K} f_k^2 \tilde{A}_k(m,n)} = \frac{\sum_{k=1}^{K} f_k \tilde{A}_k(m,n) \tilde{\phi}_k(m,n)}{\sum_{k=1}^{K} f_k^2 \tilde{A}_k(m,n)}$$ Equation 8

In Equation 8, $f_k$ is modulation frequency, $\tilde{A}_k$ (m, n) is an amplitude of the signal for the selected pixel, and $\emptyset_k$ (m, n) is a phase of the signal for the selected pixel.

In some examples, the ToF (t) for each pixel 210 in an image 200 may be calculated by a ToF calculation module 415 (see FIG. 4) by implementing Equation 8 to the received signal. The ToF imaging system 100 may process each pixel in an array in order to capture the scene accurately, and thus produce the identified image in systems such as virtual or augmented reality or other applications that may employ a depth sensor.

Moreover, the error produced by the noise for any one pixel may be measured by the error calculation module 420 (see FIG. 4) by calculating E(m, n) in Equation 9:

$$Ea(m,n) = \sum_{k=1}^{K} \tilde{A}_k(m,n) f_k^2 |\tilde{t}_k(m,n) - t(m,n)| = 0$$ Equation 9

Thus, the identification of the time for a signal between the ToF imaging system 100 and the target object 20 may produce depth or distance information for the captured image.

Additionally or alternatively, FIG. 3 describes a neighborhood based technique that correlates information from multiple pixels 310 (as opposed to each pixel) surrounding the selected pixel 315 in order to accurately measure the received signal. Although the neighborhood based technique provides greater accuracy for distance measurement, it is also more resource intensive because of computationally complexity required to implement the neighborhood based technique as compared to the pixel-wise technique described with reference to FIG. 2.

Here, the two-dimensional array 130 of pixel detectors 140 calculates the ToF for the light in order to identify the accurate distance (Z) between the ToF imaging system 100 and target object 20 based on information from a plurality of pixels 310. Specifically, the signal detection process for the pixel 315 (m, n) may be dependent on information identified not only for the selected pixel 315 (m, n), but also from neighboring pixels 310 (i, j). The contribution of the pixels of a neighborhood 310 of the selected pixel 315 (m, n) is based on normalized weighting coefficients λ (i, j). These coefficients may provide an adaptive way of processing the signal to ensure edge preserving where more weight is applied in low SNR scenarios, and heave as Dirac's delta in the case of high SNR. As such, features of the present disclosure may preserve the high frequency component of the image.

The ToF calculations performed by the ToF calculation module 415 (see FIG. 4) for the neighborhood based technique may be calculated based on Equation 10:

$$t(m,n) = \frac{\sum_{k=1}^{K} f_k \sum_{i=m-I}^{m+I} \sum_{j=n-J}^{n+J} \lambda(i,j) \tilde{A}_k(i,j) \tilde{t}_k(i,j)}{\sum_{k=1}^{K} f_k \sum_{i=m-I}^{m+I} \sum_{j=n-J}^{n+J} \lambda(i,j) \tilde{A}_k(i,j)}$$ Equation 10

In Equation 10, $f_k$ is modulation frequency, $\tilde{A}_k$ (i, j) is an amplitude of the signals for the one or more neighboring pixels to the selected pixel, and λ (i, j) is a normalized weighting coefficients for the one or more neighboring pixels to the selected pixel.

The error function E (m, n) may be implemented by the error calculation module 420 (see FIG. 4) using Equation 11:

$$\sum_{k=1}^{K} f_k^2 \sum_{i=m-I}^{m+I} \sum_{j=n-J}^{n+J} \lambda(i,j) \tilde{A}_k(i,j) |\tilde{t}(i,j) - t(m,n)| = 0$$ Equation 11

Thus, as described above with reference to both pixel-wise and neighborhood based techniques, features of the present disclosure implement a ToF imaging system for calculating the ToF and the error produced by noise for an image signal that is independent of the modulation frequency. Implementation of this technique provide improved accuracy in distance measurement and reduced system complexity over conventional systems.

Figure 4:
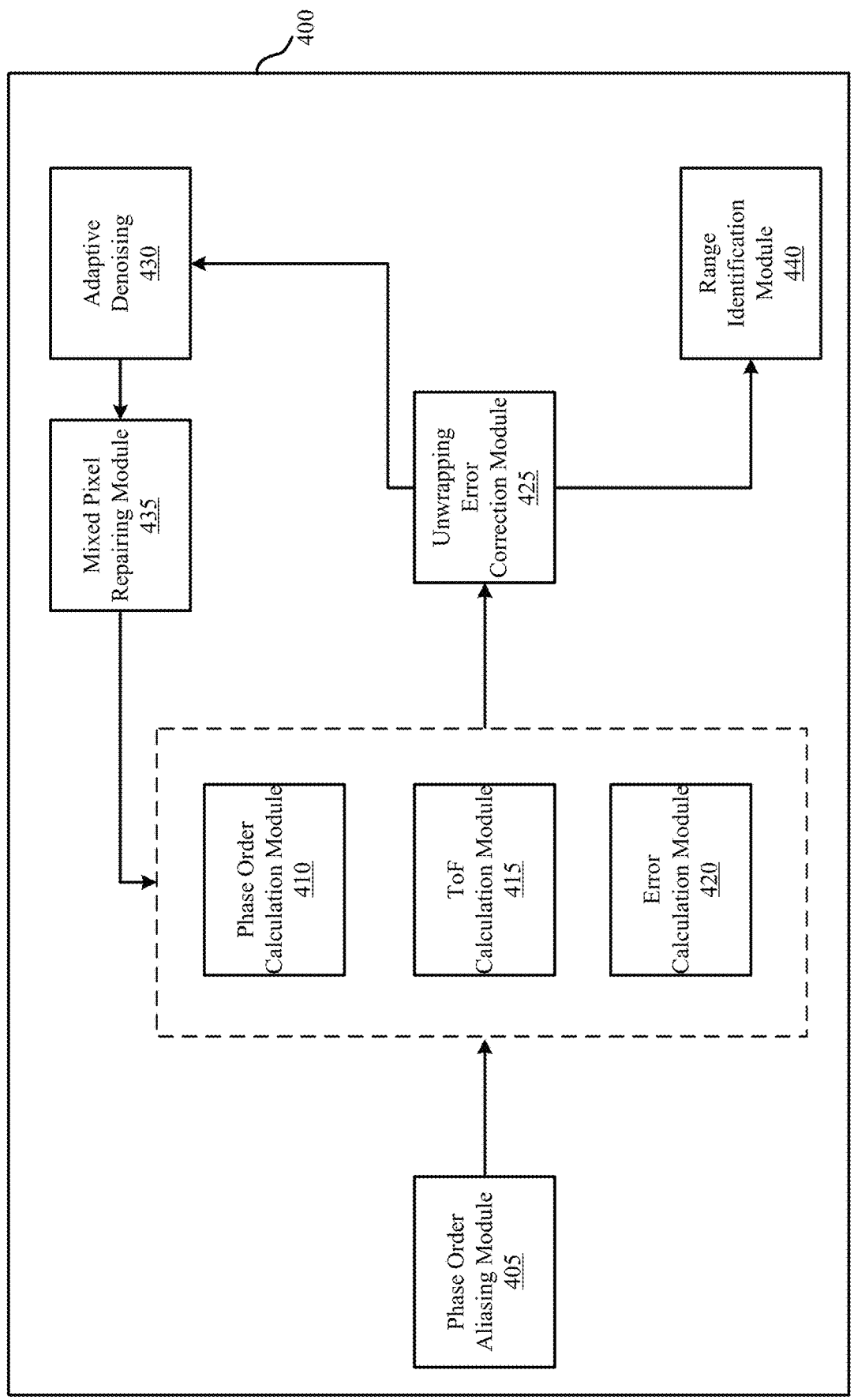
FIG. 4 is a schematic diagram of depth sensing component and process implemented by the ToF imaging system.

The process implemented by the ToF imaging system 100 is now described with reference to FIG. 4 that is a schematic diagram of depth sensing component 400. Based on the signal captured by the two-dimensional array 130 of pixel detectors 140 of an image, the depth sensing component 400 may first process the signal with the phase order aliasing module 405. The Phase order aliasing module 405 may identify a maximum phase order for the received signal for one or more pixels. Upon identification of the maximum phase order, the phase order calculation module 410 may identify the phase order of the signal. The signal is also passed through ToF calculation module 415 to implement either Equations 8 or 10 discussed above in order to calculate the ToF for the signal. The selection of either Equation 8 or 10 for implementation by the ToF calculation module 415 is based on the depth sensor component 400 selecting either the pixel-wise or neighborhood based processing. Additionally, the error calculation module 420 may calculate the error produced by the noise in the signal based on implementation of Equations 9 and 11 discussed above. Again, the selection of either Equation 9 or 11 is based on selection of either the pixel-wise or neighborhood based processing.

Upon calculating the phase order, ToF, and the noise error, a time of flight and a distance is identified. However, in some instances, there may be one or more pixels or data points in the captured image 200 that may be erroneous. For example, one or more errant pixels may have charged and/or discharged incorrectly, and thus may reflect an object in a scene that may not otherwise be there (e.g., appearing as a wall or object in midair of an augmented reality scene). Such errors may contribute to the overall user experience. Existing solutions fail to adequately account for these errors. For example, existing solutions may simply either ignore the erroneous pixel(s) or completely cancel them from the image. Both of these broad solutions are inadequate. For example, if the erroneous pixels are simply ignored, the pixel(s) may be floating in the scene (e.g., a user's hand appearing to be disjointed). Similarly, if the pixels are canceled, an image (e.g., the hand) that would otherwise be in the scene would be complexly missing, and thus again contributing to a poor user experience.

Features of the present disclosure, and more specifically the unwrapping error correction module 425, allow for substitution of these erroneous pixels based on information gathered from neighboring pixels, and thus adjust the distance and data point information for each pixel. Specifically, the unwrapping error correction module 425 calculates the unwrapping error and removes misclassified phase orders. As noted above, the error minimization process exposed in Equations 9 and 11 may return an error value and the phase order $n_k$ for the used modulation frequencies. For low SNR areas, the value of the noise may be high enough to produce local changes in the phase orders. Thus, the unwrapping error correction module 425 allows for substitution of the error with data points gathered from neighboring pixels.

Further, the adaptive denoising module 430 and mixed pixel repairing module 435 allow the ToF imaging system to repair the edges, and to offer a better signal to noise ratio in conflictive points that may help with classification. Specifically, by employing the functions provided below for denoising the signal, features of the present disclosure allow an increased SNR such that the depth sensing component 400 may calculate greater distances using less power than conventional systems. In some examples, the adaptive denoising module 430 may introduce weighted factors that may provide an adaptive way of processing the signal in order to allow edge preserving. For the high SNR, the adaptive denoising module 430 may preserve information gathered from signals of multiple frequencies. However, for signals with low SNR, the adaptive denoising module 430 may provide an average distance estimation by using weight factor. To this end, in some examples, the adaptive denoising module 430 may calculate the coefficients for the weight factors based on Equation 12 below:

$$\begin{cases} \lambda_k(i,j) = \dfrac{|\tilde{S}_k(m,n)|^2}{|\tilde{S}_k(i,j) - \tilde{S}_k(m,n)|^2} & \text{if } i \ne m \text{ and } j \ne n \\ \lambda_k(m,n) = \dfrac{|\tilde{S}_k(m,n)|^2}{|\overline{\tilde{S}_k} - \tilde{S}_k(m,n)|^2} & \text{if } i = m \text{ and } j = n \end{cases} \quad \text{Equation 12}$$

$$\overline{\tilde{S}_k} = \frac{1}{(2I+1)\cdot(2J+1)} \sum_{i=m-I}^{m+I} \sum_{j=n-J}^{n+J} \tilde{S}_k(i,j)$$

The final denoised signal may be calculated by the adaptive denoising module 430 based on Equation 13 below:

$$\tilde{S}_k^d = \sum_{i=m-I}^{m+I} \sum_{j=n-J}^{n+J} \frac{\lambda_k(i,j)\cdot \tilde{S}_k(i,j)}{\Delta_k} \quad \text{Equation 13}$$

$$\text{where } \Delta_k = \frac{1}{(2I+1)\cdot(2J+1)} \sum_{i=m-I}^{m+I} \sum_{j=n-J}^{n+J} \lambda_k(i,j)$$

Thereafter, the signal is fed back for iterative phase order, ToF, and error calculations before the range identification module 440 accurately identifies the distance (Z) between the ToF imaging system and the target object.

Figure 5:
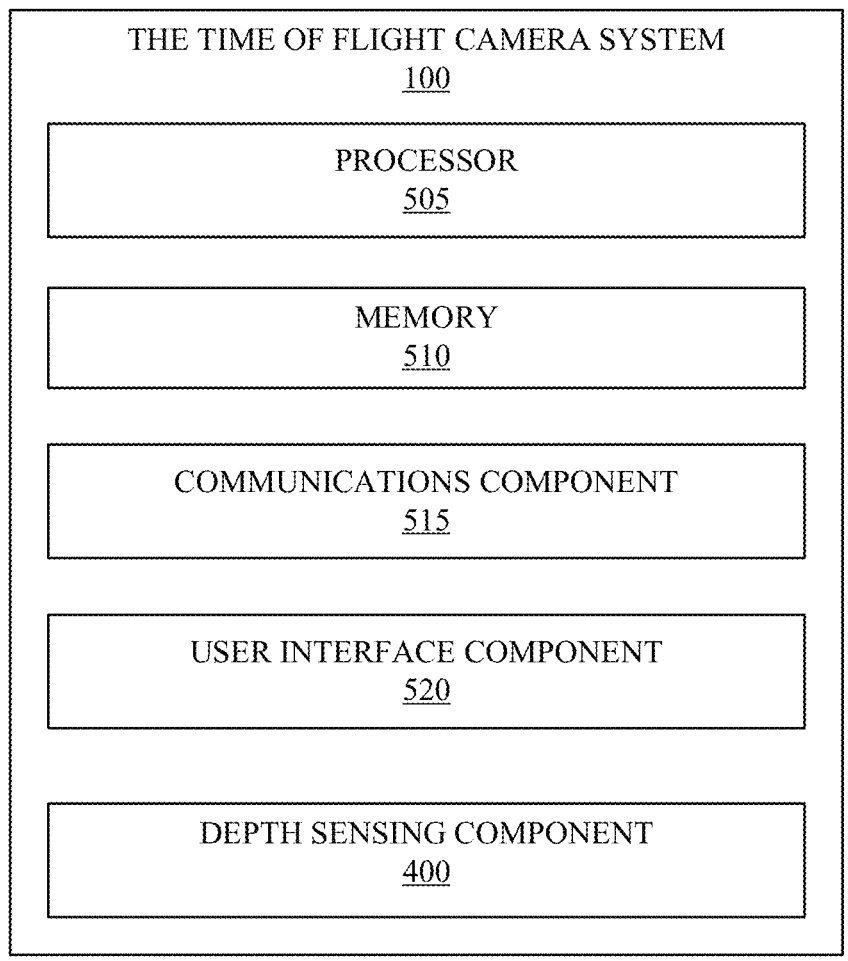
FIG. 5 is a diagram illustrating an example of a hardware implementation for a ToF imaging system in accordance with various aspects of the present disclosure.

Referring now to FIG. 5, a diagram illustrating an example of a hardware implementation for a ToF imaging system 100 in accordance with various aspects of the present disclosure is described. In some examples, the ToF imaging system 100 may be an example of the electronic device described with reference to FIG. 1A. The ToF imaging system 100 may include a processor 505 for carrying out one or more processing functions (e.g., method 600) described herein. The processor 505 may include a single or multiple set of processors or multi-core processors. Moreover, the processor 505 can be implemented as an integrated processing system and/or a distributed processing system.

The ToF imaging system 100 may further include memory 510, such as for storing local versions of applications being executed by the processor 505. In some aspects, the memory 510 may be implemented as a single memory or partitioned memory. In some examples, the operations of the memory 510 may be managed by the processor 505. Memory 510 can include a type of memory usable by a computer, such as random access memory (RAM), read only memory (ROM), tapes, magnetic discs, optical discs, volatile memory, non-volatile memory, and any combination thereof. Additionally, the processor 505, and memory 510 may include and execute operating system (not shown).

Further, the ToF imaging system 100 may include a communications component 515 that provides for establishing and maintaining communications with one or more parties utilizing hardware, software, and services as described herein. Communications component 515 may carry communications between components and modules of the ToF imaging system 100 described in FIG. 4. The communications component 515 may also facilitate communications with external devices to the ToF imaging system 100, such as to electronic devices coupled locally to the ToF imaging system 100 and/or located across a communications network and/or devices serially or locally connected to ToF imaging system 100. For example, communications component 515 may include one or more buses operable for interfacing with external devices.

The ToF imaging system 100 may also include a user interface component 520 operable to receive inputs from a user of the ToF imaging system 100 and further operable to generate outputs for presentation to the user. User interface component 520 may include one or more input devices, including but not limited to a navigation key, a function key, a microphone, a voice recognition component, any other mechanism capable of receiving an input from a user, or any combination thereof. Further, user interface component 520 may include one or more output devices, including but not limited to a display, a speaker, any other mechanism capable of presenting an output to a user, or any combination thereof. The ToF imaging system 100 may further include a depth sensing component 400 that may further include components and modules described with reference to FIG. 4.

Figure 6:
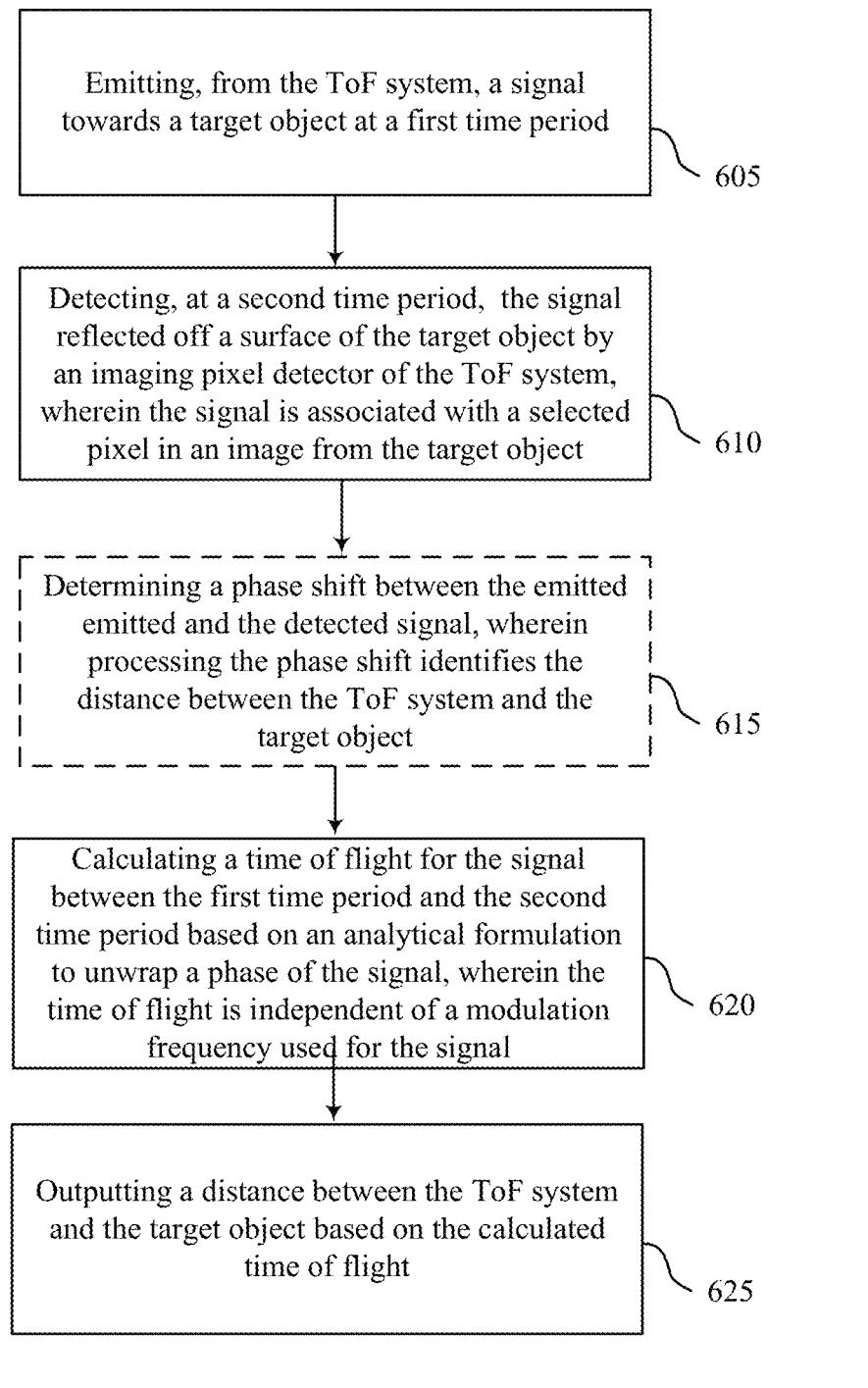
FIG. 6 is a flowchart of a method for time synchronizing an in-cell touch screen display with a stylus implemented by an in-cell digitizer in accordance with aspects of the present disclosure.

Turning next to FIG. 6, method 600 for signal processing in the ToF system is described. The method 600 may be performed by the ToF system 100 as described with reference to FIGS. 1 and 5. Although the method 600 is described below with respect to the elements of the ToF system 100, the method 600 may be performed by any depth sensing system (e.g., depth or distance sensors).

At block 605, the method 600 may include emitting, from the ToF system, an optical energy towards a target object at a first time period. In some examples, the processor 400 (see FIG. 5) or microprocessor 160 (see FIG. 1) may periodically energize and emit optical energy via lens towards a target object. The optical energy may be light emitted by a laser diode or LED device.

At block 610, the method 600 may include detecting, at a second time period, a signal reflected off a surface of the target object by an imaging pixel detector of the ToF system. In some examples, the detected signal may include noise, but may be free of multi-path. Aspects of block 610 may be detected by two-dimensional array 130 of pixel or photodetectors 140 described with reference to FIG. 1. When reflected optical energy impinges upon photodetectors 140 in array 130, photons within the photodetectors are released, and converted into tiny amounts of detection current.

At block 615, the method 600 may optionally include determining a phase shift between the emitted optical energy and the detected signal. The processing of the phase shift may identify the distance between the ToF system and the target object. Aspects of block 615 may be performed by depth sensing component 400, and more specifically the unwrapping error correction module 425 described with reference to FIGS. 4 and 5.

At block 620, the method 600 may include calculating a time of flight for the signal between the first time period and the second time period based on an analytical formulation to unwrap a phase of the signal. The time of flight may be independent of a modulation frequently used for the emitted signal. Aspects of block 620, may be performed by depth sensing component 400, and more specifically the ToF calculation module 415 described with reference to FIGS. 4 and 5.

At block 625, the method 600 may include outputting a distance between the ToF system and the target object based on the calculated time of flight. Aspects of block 625, may be performed by depth sensing component 400, and more specifically the range identification module 440 described with reference to FIGS. 4 and 5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media. While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for signal processing in a time of flight (ToF) system, comprising:
    emitting, from the ToF system, a signal towards a target object at a first time period;
    detecting, at a second time period, the signal reflected off a surface of the target object by an imaging pixel detector of the ToF system, wherein the signal is associated with a selected pixel in an image from the target object;
    calculating a time of flight between the first time period and the second time period based on an analytical formulation to unwrap a phase of the signal, wherein the time of flight is independent of a modulation frequency used for the signal, wherein the time of flight is calculated by a ToF calculation module applying the following equation to the signal:

$$t = \frac{\sum_{k=1}^{K} f_k^2 \tilde{A}_k(m,n) \tilde{t}_k(m,n)}{\sum_{k=1}^{K} f_k^2 \tilde{A}_k(m,n)} = \frac{\sum_{k=1}^{K} f_k^2 \tilde{A}_k(m,n) \tilde{\phi}_k(m,n)}{\sum_{k=1}^{K} f_k^2 \tilde{A}_k(m,n)}$$

wherein
        $f_k$ is modulation frequency,
        $\tilde{A}_k(m,n)$ is an amplitude of the signal for the selected pixel, and $\emptyset_k(m,n)$ is a phase of the signal for the selected pixel; and
    outputting a distance between the ToF system and the target object based on the calculated time of flight for the signal.

2. The method of claim 1, wherein calculating the time of flight between the first time period and the second time period comprises:
    analyzing the signal from the selected pixel of the image captured by the signal to identify the time of flight, wherein analyzing the signal comprises excluding information from another pixel in the image for calculating the time of flight of the signal.

3. The method of claim 1, wherein calculating the time of flight between the first time period and the second time period comprises:
- identifying one or more neighboring pixels to the selected pixel for which the ToF is being analyzed based on the detected signal; and
- receiving a neighboring time of flight information for the one or more neighboring pixels in order to identify the time of flight for the signal for the selected pixel.

4. The method of claim 1, wherein calculating the time of flight between the first time period and the second time period comprises:
- identifying an error phase order value for a modulation frequency of the signal for the selected pixel;
- receiving information from one or more neighboring pixels that are associated with the selected pixel; and
- substituting the error phase order value for the selected pixel based on the information from the one or more neighboring pixels.

5. The method of claim 1, wherein calculating the time of flight between the first time period and the second time period comprises:
- detecting a phase shift between the emitted signal and the detected signal.

6. A computer device for signal processing in a time of flight (ToF) system, comprising:
- a memory to store data and instructions; and
- a processor in communication with the memory to execute the instructions to:
  - emit, from the ToF system, a signal towards a target object at a first time period;
  - detect, at a second time period, the signal reflected off a surface of the target object by an imaging pixel detector of the ToF system, wherein the signal is associated with a selected pixel in an image from the target object;
  - calculate a time of flight between the first time period and the second time period based on an analytical formulation to unwrap a phase of the signal, wherein the time of flight is independent of a modulation frequency used for the signal, wherein the time of flight for the signal is calculated by a ToF calculation module applying the following equation to the signal:

$$t(m,n) = \frac{\sum_{k=1}^{K} f_k \sum_{i=m-I}^{m+I} \sum_{j=n-J}^{n+J} \lambda(i,j) \tilde{A}_k(i,j) \tilde{t}_k(i,j)}{\sum_{k=1}^{K} f_k \sum_{i=m-I}^{m+I} \sum_{j=n-J}^{n+J} \lambda(i,j) \tilde{A}_k(i,j)}$$

wherein
- $f_k$ is modulation frequency,
- $\tilde{A}_k(i,j)$ is an amplitude of the signals for the one or more neighboring pixels to the selected pixel, and
- $\lambda(i,j)$ is a normalized weighting coefficients for the one or more neighboring pixels to the selected pixel; and
- output a distance between the ToF system and the target object based on the calculated time of flight for the signal.

7. The computer device of claim 6, wherein the instruction to calculate the time of flight between the first time period and the second time period further include instructions to:
- analyze the signal from the selected pixel of the image captured by the signal to identify the time of flight, wherein analyzing the signal comprises excluding information from another pixel in the image for calculating the time of flight of the signal.

8. The computer device of claim 7, wherein the time of flight is calculated by a ToF calculation module applying the following equation to the signal:

$$t = \frac{\sum_{k=1}^{K} f_k^2 \tilde{A}_k(m,n) \tilde{t}_k(m,n)}{\sum_{k=1}^{K} f_k^2 \tilde{A}_k(m,n)} = \frac{\sum_{k=1}^{K} f_k \tilde{A}_k(m,n) \tilde{\phi}_k(m,n)}{\sum_{k=1}^{K} f_k^2 \tilde{A}_k(m,n)}$$

wherein:
- $f_k$ is modulation frequency,
- $\tilde{A}_k(m,n)$ is an amplitude of the signal for the selected pixel, and
- $\emptyset_k(m,n)$ is a phase of the signal for the selected pixel.

9. The computer device of claim 6, wherein the instructions to calculate the time of flight between the first time period and the second time period further comprise instructions to:
- identify one or more neighboring pixels to the selected pixel for which the ToF is being analyzed based on the detected signal; and
- receive a neighboring time of flight information for the one or more neighboring pixels in order to identify the time of flight for the signal for the selected pixel.

10. The computer device of claim 6, wherein the instructions to calculate the time of flight between the first time period and the second time period further comprise instructions to:
- identify an error phase order value for a modulation frequency of the signal for the selected pixel;
- receive information from one or more neighboring pixels that are associated with the selected pixel; and
- substitute the error phase order value for the selected pixel based on the information from the one or more neighboring pixels.

11. The computer device of claim 6, wherein the instructions to calculate the time of flight between the first time period and the second time period further comprise instructions to:
- detect a phase shift between the emitted signal and the detected signal.

12. A storage device storing instructions executable by a computer device for signal processing in a time of flight (ToF) system, the instructions comprising code for:
- emitting, from the ToF system, a signal towards a target object at a first time period;
- detecting, at a second time period, the signal reflected off a surface of the target object by an imaging pixel detector of the ToF system, wherein the signal is associated with a selected pixel in an image from the target object;
- calculating a time of flight between the first time period and the second time period based on an analytical formulation to unwrap a phase of the signal, wherein the time of flight is independent of a modulation frequency used for the signal, wherein the time of flight is calculated by a ToF calculation module applying the following equation to the signal:

$$t = \frac{\sum_{k=1}^{K} f_k^2 \tilde{A}_k(m,n)\tilde{t}_k(m,n)}{\sum_{k=1}^{K} f_k^2 \tilde{A}_k(m,n)} = \frac{\sum_{k=1}^{K} f_k \tilde{A}_k(m,n)\tilde{\phi}_k(m,n)}{\sum_{k=1}^{K} f_k^2 \tilde{A}_k(m,n)}$$

wherein
$f_k$ is modulation frequency,
$\tilde{A}_k(m, n)$ is an amplitude of the signal for the selected pixel, and $\emptyset_k (m, n)$ is a phase of the signal for the selected pixel; and
outputting a distance between the ToF system and the target object based on the calculated time of flight for the signal.

13. The storage device of claim 12, wherein the code for calculating the time of flight between the first time period and the second time period comprises code for:
analyzing the signal from the selected pixel of the image captured by the signal to identify the time of flight, wherein analyzing the signal comprises excluding information from another pixel in the image for calculating the time of flight of the signal.

14. The storage device of claim 12, wherein the code for calculating the time of flight between the first time period and the second time period further comprises code for:
identifying one or more neighboring pixels to the selected pixel for which the ToF is being analyzed based on the detected signal; and
receiving a neighboring time of flight information for the one or more neighboring pixels in order to identify the time of flight for the signal for the selected pixel.

15. The storage device of claim 14, wherein the time of flight for the signal is calculated by a ToF calculation module applying the following equation to the signal:

$$t(m,n) = \frac{\sum_{k=1}^{K} f_k \sum_{i=m-I}^{m+I} \sum_{j=n-J}^{n+J} \lambda(i,j)\tilde{A}_k(i,j)\tilde{t}_k(i,j)}{\sum_{k=1}^{K} f_k \sum_{i=m-I}^{m+I} \sum_{j=n-J}^{n+J} \lambda(i,j)\tilde{A}_k(i,j)}$$

wherein:
$f_k$ is modulation frequency,
$\tilde{A}_k (i, j)$ is an amplitude of the signals for the one or more neighboring pixels to the selected pixel, and
$\lambda (i, j)$ is a normalized weighting coefficients for the one or more neighboring pixels to the selected pixel.

16. The storage device of claim 12, wherein the code for calculating the time of flight between the first time period and the second time period comprises code for:
identifying an error phase order value for a modulation frequency of the signal for the selected pixel;
receiving information from one or more neighboring pixels that are associated with the selected pixel; and
substituting the error phase order value for the selected pixel based on the information from the one or more neighboring pixels.

* * * * *